(12) United States Patent
Irie

(10) Patent No.: US 7,224,349 B2
(45) Date of Patent: May 29, 2007

(54) ELECTRONIC APPARATUS

(75) Inventor: Michio Irie, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 358 days.

(21) Appl. No.: 10/457,767

(22) Filed: Jun. 10, 2003

(65) Prior Publication Data
US 2004/0041775 A1    Mar. 4, 2004

(30) Foreign Application Priority Data
Jun. 18, 2002    (JP)    ............................. 2002-177517

(51) Int. Cl.
*G09G 5/00* (2006.01)
(52) U.S. Cl. ............................. 345/204; 345/7; 345/3.1
(58) Field of Classification Search ................... 345/99, 345/204, 73.1, 558; 119/721; 340/10.1; 235/462.46; 455/296; 348/160; 607/60; 705/57; 375/130, 367, 219, 140, 142; 331/178; 331/78; 324/76.11; 382/232; 342/457, 342/127
See application file for complete search history.

(56) References Cited

U.S. PATENT DOCUMENTS

| | | | | |
|---|---|---|---|---|
| 4,740,792 | A * | 4/1988 | Sagey et al. ................. | 342/457 |
| 4,847,603 | A * | 7/1989 | Blanchard ........................ | 345/7 |
| 5,488,627 | A * | 1/1996 | Hardin et al. ................. | 375/139 |
| 5,640,002 | A * | 6/1997 | Ruppert et al. ......... | 235/462.46 |
| 5,769,032 | A * | 6/1998 | Yarnall et al. ............... | 119/721 |
| 5,872,807 | A * | 2/1999 | Booth et al. ................. | 375/130 |
| 5,999,561 | A * | 12/1999 | Naden et al. ................. | 375/142 |
| 6,046,735 | A * | 4/2000 | Bassetti et al. ............. | 345/204 |
| 6,169,889 | B1 * | 1/2001 | Servilio et al. ............. | 455/296 |
| 6,366,174 | B1 * | 4/2002 | Berry et al. ................... | 331/78 |
| 6,396,438 | B1 * | 5/2002 | Seal ........................... | 342/127 |
| 6,493,275 | B2 * | 12/2002 | Tomita .................. | 365/189.09 |
| 6,555,998 | B1 * | 4/2003 | Kishimoto et al. ....... | 324/76.11 |
| 6,580,432 | B1 * | 6/2003 | Leung et al. ................ | 345/558 |
| 6,600,771 | B1 | 7/2003 | Moon et al. | |
| 6,639,939 | B1 * | 10/2003 | Naden et al. ................ | 375/140 |
| 6,643,317 | B1 * | 11/2003 | Blumer ........................ | 375/130 |
| 6,657,622 | B2 | 12/2003 | Park | |
| 6,687,319 | B1 * | 2/2004 | Perino et al. ................ | 375/367 |
| 6,693,511 | B1 * | 2/2004 | Seal ........................... | 340/10.1 |
| 6,876,339 | B2 * | 4/2005 | Hiroki ......................... | 345/3.3 |
| 2002/0060672 | A1 * | 5/2002 | Shin et al. ................... | 345/204 |
| 2002/0128974 | A1 * | 9/2002 | Ikeda et al. .................... | 705/57 |
| 2003/0063193 | A1 * | 4/2003 | Hongou ...................... | 348/160 |
| 2003/0065370 | A1 * | 4/2003 | Lebel et al. ................... | 607/60 |
| 2003/0108246 | A1 * | 6/2003 | Takeuchi et al. ............ | 382/232 |
| 2003/0123532 | A1 * | 7/2003 | Mauritz et al. .............. | 375/219 |
| 2003/0174126 | A1 * | 9/2003 | Wang .......................... | 345/204 |
| 2004/0196212 | A1 * | 10/2004 | Shimizu ...................... | 345/3.1 |

(Continued)

FOREIGN PATENT DOCUMENTS

EP    0 163 313 A2    12/1985

(Continued)

*Primary Examiner*—Bipin Shalwala
*Assistant Examiner*—Prabodh Dharia
(74) *Attorney, Agent, or Firm*—Oliff & Berridge, PLC

(57) ABSTRACT

The invention efficiently decreases EMI noise occurring with regard to the entirety of an electronic apparatus with a plurality of clocks as references for the operations. The spread spectrum is applied to the clock used by the largest number of ICs, that is, a display clock from among three types of clocks.

14 Claims, 3 Drawing Sheets

U.S. PATENT DOCUMENTS

2005/0105590 A1* 5/2005 Egan et al. .................. 375/130

FOREIGN PATENT DOCUMENTS

| EP | 0 739 089 A2 | 10/1996 |
| EP | 1 139 324 A2 | 10/2001 |
| JP | A 61-24321 | 2/1986 |
| JP | A 7-235862 | 9/1995 |
| JP | A 9-98152 | 4/1997 |
| JP | A 10-31470 | 2/1998 |
| JP | A 2000-125149 | 4/2000 |
| JP | A 2000-216667 | 8/2000 |
| JP | A 2000-252817 | 9/2000 |
| JP | A-2001-191585 | 7/2001 |
| JP | A-2001-515696 | 9/2001 |
| JP | A-2001-282165 | 10/2001 |
| JP | A-2002-91367 | 3/2002 |
| JP | A-2002-91603 | 3/2002 |
| JP | A 2002-158839 | 5/2002 |

\* cited by examiner

ELECTRONIC APPARATUS

BACKGROUND OF THE INVENTION

1. Field of Invention

The present invention relates to decreasing EMI noise that electronic apparatuses generate.

2. Description of Related Art

Noise generated by various types of electronic apparatuses may cause undesirable interferences (EMI(Electromagnetic Interference)) against other electronic apparatuses. Various types of regulations are therefore stipulated for the noise (hereinafter "EMI noise") generated by the electronic apparatuses.

When related art electronic apparatuses are developed and manufactured, manufacturers may intend to decrease the EMI noise generated by the electronic apparatuses so that the electronic apparatuses to be manufactured meet EMI noise regulations.

The electronic apparatus generally operates in accordance with one type or a plurality of types of clocks used as a reference. FIG. 3 is a schematic showing an exemplary frequency spectrum of a clock. As indicated with the solid line, the frequency spectrum of the clock usually has the peaks of the amplitudes at the oscillation frequency (fundamental wave: f1) of the clock and the frequencies (f2, f3, . . . ) corresponding to each of its harmonics. This causes the frequency spectrum of the EMI noise occurring in the electronic apparatus as well to generally have the peaks of the amplitudes at the oscillation frequency of the clock (f1) and the frequency (f2, f3, . . . ) corresponding to each of its harmonics. In order to decrease the EMI noise, the peaks of the amplitudes occurring at each of the frequencies of the fundamental wave and its harmonics are required to be decreased.

One way to realize this is to vary the oscillation frequency of the clock, as indicated with the dashed line in FIG. 3. The frequency spectrum is spread to decrease the peaks of the amplitudes of the frequency spectrum generated at the frequencies of the fundamental wave (f1) and its harmonics (f2, f3 . . . ) of the clock. Hereinafter, varying the oscillation frequency of the clock to spread the frequency spectrum is referred to as "spread spectrum". The amount of variation in the oscillation frequency of the clock is referred to as "spread amount". Generally, the more the spread amount becomes, the more EMI noise can be reduced or suppressed.

SUMMARY OF THE INVENTION

Thus, in an electronic apparatus, by applying the spread spectrum to a clock that is used as a reference for the operation, reduction or suppression of EMI noise occurring can be achieved. However, since applying the spread spectrum to the clock is expensive, there is a problem to which clock the frequency spectrum is applied where there is a plurality of types of clocks that serve as the references for the operations in the electronic apparatus.

Accordingly, the present invention addresses or solves the above and/or other problems, and provides the ability to efficiently decrease EMI noise as the entirety of the electronic apparatus where there is a plurality of types of clocks that are used as the references for the operations in the electronic apparatus.

To address or achieve at least a part of the above, a first exemplary electronic apparatus of the present invention is provided that operates based on a plurality of types of clocks including a spread spectrum clock whose frequency spectrum is spread and a non-spread spectrum clock whose frequency spectrum is not spread. The electronic apparatus includes a plurality of ICs using the clocks as references for the operations, and at least the clock used by the largest number of ICs is the spread spectrum clock from among the plurality of types of clocks.

In the present invention, by using as the spread spectrum clock the clock that is employed by the largest number of ICs, all of the EMI noise generated by at least these ICs can be decreased. The EMI noise occurring as the entirety of the electronic apparatus can be efficiently decreased.

A second exemplary electronic apparatus of the present invention is provided that operates based on a plurality of types of clocks including a spread spectrum clock whose frequency spectrum is spread and a non-spread spectrum clock whose frequency spectrum is not spread. The electronic apparatus includes a plurality of ICs using the clocks as references for the operations and at least one clock generator generating the clocks, and at least the clock with the longest signal path from the clock generator generating the clock to the IC where the clock is ultimately provided is the spread spectrum clock from among the plurality of types of clocks.

In the present invention, by using, as the spread spectrum clock, the clock with the longest signal path from the clock generator to the IC where the clock is ultimately provided, all the EMI noise occurring from the ICs using the clock as well as all the EMI noise occurring from the wires connecting these ICs to carry the clock can be efficiently decreased.

A third exemplary electronic apparatus of the present invention is provided that operates based on a plurality of types of clocks including a spread spectrum clock whose frequency spectrum is spread and a non-spread spectrum clock whose frequency spectrum is not spread. In the electronic apparatus, at least the clock with the highest frequency is the spread spectrum clock from among the plurality of types of clocks.

In the present invention, by using the clock with the highest frequency as the spread spectrum clock, the energy of the EMI noise occurring as the entirety of the electronic apparatus can be efficiently suppressed, thus realizing decrease in the EMI noise.

A fourth exemplary electronic apparatus of the present invention is provided that operates based on a plurality of types of clocks including a spread spectrum clock whose frequency spectrum is spread and a non-spread spectrum clock whose frequency spectrum is not spread. The electronic apparatus includes at least one clock generator generating the clocks, and at least the clock with the highest output current from the clock generator is the spread spectrum clock from among the plurality of types of clocks.

In the present invention, by using the clock with the highest output current output from the clock generator as the spread spectrum clock, the energy of the EMI noise occurring as the entirety of the electronic apparatus can be efficiently suppressed.

A fifth exemplary electronic apparatus of the present invention is provided that operates based on a plurality of types of clocks including a spread spectrum clock whose frequency spectrum is spread and a non-spread spectrum clock whose frequency spectrum is not spread. The electronic apparatus includes at least one clock generator generating the clocks, and at least the clock with the highest driving power voltage of driving the clock generator is the spread spectrum clock from among the plurality of types of clocks.

In the present invention, by using the clock with the highest driving power voltage of driving the clock generator as the spread spectrum clock, in the same manner as in the fourth electronic, the energy of the EMI noise occurring as the entirety of the electronic apparatus can be efficiently suppressed.

In the electronic apparatus of the present invention, the at least one clock generator includes at least a first clock generator generating the spread spectrum clock and a second clock generator generating the non-spread spectrum clock. Preferably, the first clock generator and the second clock generator share the same IC.

Such a construction contributes to the reduction or curtailment of the number of parts and the area occupied on the circuitboards.

A projector of the present invention includes at least a liquid crystal panel and operating based on a plurality of types of clocks having a spread spectrum clock whose frequency spectrum is spread and a non-spread spectrum clock whose frequency spectrum is not spread. In the liquid crystal projector, at least the clock ultimately provided to the liquid crystal panel is the spread spectrum clock from among the plurality of types of clocks.

In the liquid crystal projector, the clock ultimately provided to the liquid crystal panel, that is, the display clock normally corresponds to the clock used by the largest number of ICs and corresponds to the clock that has the longest signal path from the clock generator to the IC where the clock is ultimately provided.

The present invention is not limited to a mode or the exemplary embodiments of the apparatus invention of the above electronic apparatuses, such as the liquid crystal projector. The present invention can be realized as a method, such as a spread spectrum clock selection method, for example.

DETAILED DESCRIPTION OF PREFERRED EMBODIMENTS

Hereinafter, exemplary embodiments of the present invention are described on the basis of the exemplary embodiments in the following order:
A. First Exemplary Embodiment:
B. Second Exemplary Embodiment:
C. Third Exemplary Embodiment:
D. Fourth Exemplary Embodiment:
E. Fifth Exemplary Embodiment:
F. Exemplary Modifications:

In the following exemplary embodiments, a case is described in which the present invention is applied to a liquid crystal projector, which is one of the exemplary electronic apparatuses to which the invention can be applied.

A. First Exemplary Embodiment

Figure 1:
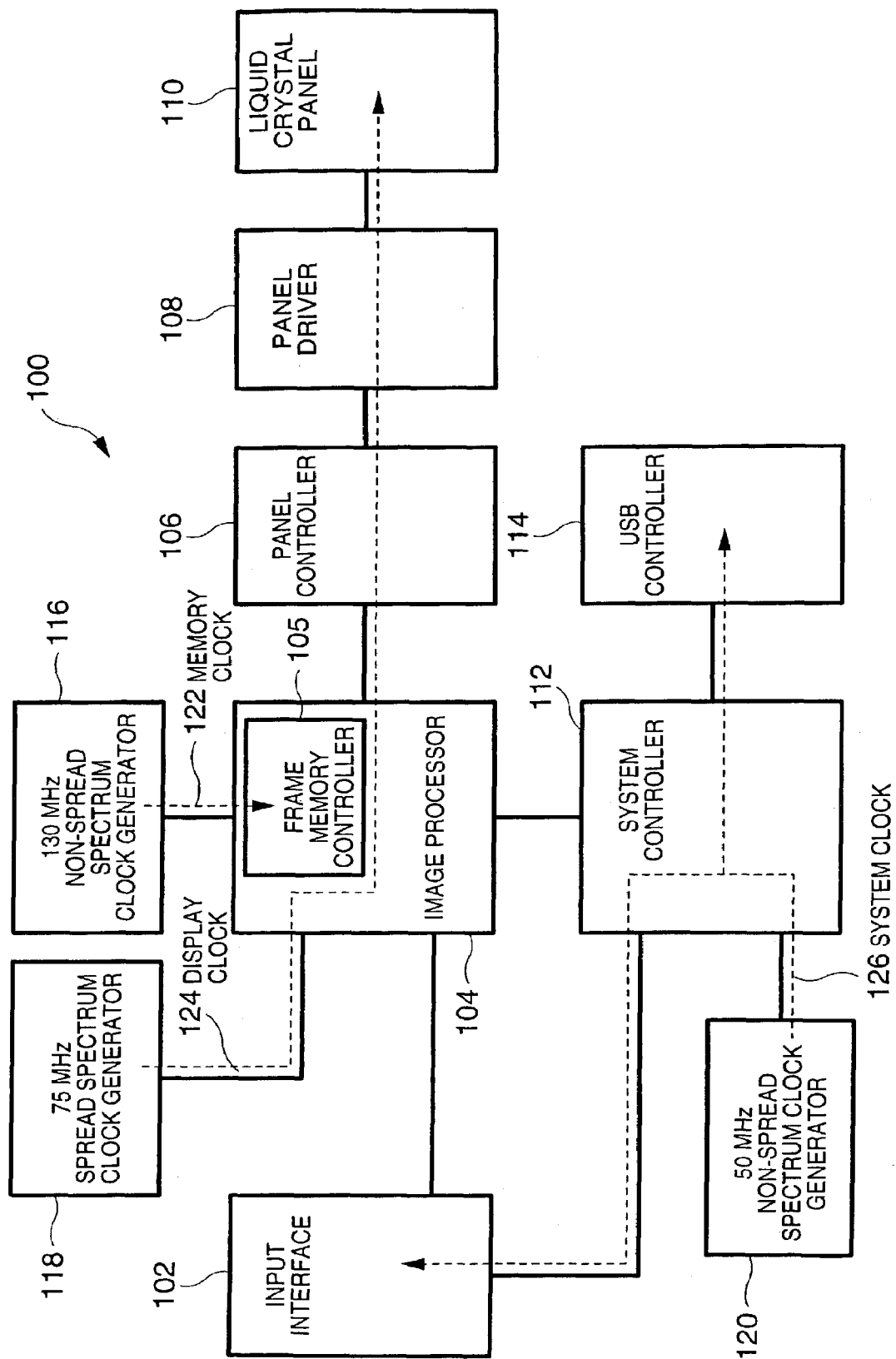
FIG. 1 is a schematic of a liquid crystal projector to which the present invention is applied.

FIG. 1 is a schematic showing the construction of a liquid crystal projector to which the present invention is applied. A liquid crystal projector 100 shown in FIG. 1 is provided primarily with an input interface 102, an image processor 104, a panel controller 106, a panel driver 108, a liquid crystal panel 110, a system controller 112, a USB (Universal Serial Bus) controller 114, a 130 MHz non-spread spectrum clock generator 116, a 75 MHz spread spectrum clock generator 118, and a 50 MHz non-spread spectrum clock generator 120, any of which is constructed using an independent IC (Integrated Circuit). Among them, the image processor 104 has a frame memory controller 105 inside.

In the input interface 102, when the signal is an analog signal, A/D conversion is performed on an input image signal, which is fed to the image processor 104; when the signal is a digital signal, the signal is converted into the signal with a format that can be provided to the image processor 104 and then is fed to the image processor 104. In the image processor 104, in accordance with control of the frame memory controller 105, the input image signal is written in frame memory (not shown) and the written image signal is read. In the processes of these writing and reading, various image processing is performed. On the basis of the image signal undergoing the image processing, the panel controller 106 controls the panel driver 108 that drives, in accordance with the control, the liquid crystal panel 110, where light radiated from an illumination optical system (not shown) in response to the drive is modulated in accordance with the image signal. The modulated light is projected on a screen (not shown) by a projection optical system, so that an image is displayed on the screen.

Other than controlling the image processor 104, the system controller 112 controls the input interface 102 and the USB controller 114. The USB controller 114 causes a control signal or the like to be fed to a USB port (not shown) from other electronic apparatuses connected thereto and vice versa.

In the present exemplary embodiment, three types of clocks, that is, a memory clock 122, a display clock 124, and a system clock 126 are provided as a clock that is used as a reference for the operation of each of the components. Among them, the memory clock 122, which is a 130 MHz clock, is generated at the 130 MHz non-spread spectrum clock generator 116 to be used as reference for only the operation of the frame memory controller 105 in the image processor 104. The display clock 124, which is a 75 MHz clock, is generated at the 75 MHz spread spectrum clock generator 118 to be used as reference for the operations of the circuit part in the image processor 104 except the frame memory controller 105, the panel controller 106, the panel driver 108, and the liquid crystal panel 110. The system clock 126, which is a 50 MHz clock, is generated at the 50 MHz non-spread spectrum clock generator 120 to be used as the reference for the operations of the input interface 102, the system controller 112 and the USB controller 114.

Hence, among these three types of clocks, the display clock 124 is used by each of the ICs of the image processor 104, the panel controller 106, the panel driver 108, and the liquid crystal panel 110, the number of which ICs is largest compared to those of the other clocks. Since the EMI noise generally occurs from the ICs using the clock, as the number of ICs using the clock increases, the amount of EMI noise caused by the clock increases.

In the present exemplary embodiment, the spread spectrum is therefore applied to such a clock used by the largest number of ICs, that is, the display clock 124. Specifically, there is used a device, which serves to output the clock (hereinafter "spread spectrum clock") whose frequency spectrum is spread by varying the oscillation frequency of the clock as the 75 MHz spread spectrum clock generator 118 generating the display clock 124, so that the display clock 124 is generated as the spread spectrum clock.

In contrast to the above, since the memory clock 122 is used by only the frame memory controller 105 in the image processor 104, the number of ICs using the memory clock 122 is only one, allowing the amount of EMI noise caused by the memory clock 122 to be small. This allows the memory clock 122 not to undergo the spread spectrum. Specifically, there is used a device, which serves to output a clock having practically a single frequency (hereinafter "non-spread spectrum clock") as the 130 MHz non-spread spectrum clock generator 116 generating the memory clock 122, so that the memory clock 122 is generated as the non-spread spectrum clock.

On the other hand, the system clock 126 is used by each of the ICs, that is, the input interface 102, the system controller 112, and the USB controller 114, the number of which ICs is less than that of the case with the display clock 124. Employing the spread spectrum clock as one used by the input interface 102 and the USB controller 114 is not desirable because of the following reasons.

1) In USB, the specification thereof strictly sets 500 ppm or below as the tolerable range of jitter with respect to a signal. Therefore, when the clock used by the USB controller 114 is spectrum-spread in order to decrease the EMI noise, in some spread amount, there is a possibility that the jitter of a signal may exceed the above tolerable range in the USB controller 114.

2) The specifications of image signals fed to the liquid crystal projector 100 exist in various types in accordance with various conditions, such as the types of devices (a computer, a DVD player, a video recorder, etc.) outputting the image signals and the resolutions of the images represented by the image signals. Hence, in the liquid crystal projector 100, in order to enable the images represented by image signals having various specifications to be displayed, the input image signal is analyzed to determine the specification thereof, in accordance with which specification the image signal is processed. A method to determine the specification of the image signal is performed by causing the input interface 102 to find the cycle, the period, the polarity, etc. of the synchronization signal as the characteristic value corresponding to the input image signal and causing the image processor 104 to find the specification of the image signal corresponding to the found characteristic value of the synchronization signal from a database that is provided in advance. The input interface 102 counts the cycle and the period of the synchronization signal using a measurement clock generated based on the system clock 126 to measure. Spectrum-spreading the system clock 126 in order to decrease the EMI noise, therefore, leads to spectrum-spread of the measurement clock generated based on the system clock 126 as well. When the measurement clock is spectrum-spread, the characteristic value of the synchronization signal to be measured may vary in accordance with variation in the oscillation frequency, which, even though the specification of the actual image signal is not changed, may lead to a determination that the specification of the image signal is changed.

Accordingly, in the present exemplary embodiment, the system clock 126 is not spectrum-spread either in the same manner as the memory clock 122. Specifically, there is used a device, which serves to output the non-spread spectrum clock as the 50 MHz non-spread spectrum clock generator 120 generating the system clock 126 in the same manner as the 130 MHz non-spread spectrum clock generator 116, so that the system clock 126 is generated as the non-spread spectrum clock.

As described above, in the present exemplary embodiment, since all the EMI noise generated by at least these ICs can be decreased by applying the spread spectrum to the display clock 124 that is used by the largest number of ICs, the EMI noise occurring at the entirety of the liquid crystal projector 100 can be efficiently decreased.

In addition, since the display clock 124 is the only clock to which the spread spectrum is applied, the cost to apply the spread spectrum can be greatly decreased.

Furthermore, since the clock, used by the USB controller 114 and the input interface 102, that is, the system clock 126 does not undergo the spread spectrum, problems, such as described above in 1) and 2), do not arise.

B. Second Exemplary Embodiment

As described above, since the EMI noise is usually generated from the ICs using the clocks, the more the number of ICs becomes, the more the amount of EMI noise is generated by the clocks. In the above first exemplary embodiment, the spread spectrum is therefore applied to the clock used by the largest number of ICs from among plurality of types of clocks.

However, the EMI noise occurs from not only the ICs using the clocks but also from the wires establishing the connections among the ICs to carry the clocks.

Accordingly, in the present exemplary embodiment, the spread spectrum is applied to a clock that has the longest signal path from a clock generator generating the clock to an IC where the clock is ultimately provided.

For example, in the liquid crystal projector 100 shown in FIG. 1, the display clock 124 is provided from the 75 MHz spread spectrum clock generator 118 to the liquid crystal panel 110 at the destination thereof via the image processor 104, the panel controller 106, and the panel driver 108, which signal path is longest compared to those of the other clocks. Hence, in the same manner as the first exemplary embodiment, the spread spectrum is applied to the display clock 124.

Thus, in the present exemplary embodiment, by applying the spread spectrum to the display clock 124 that has the longest signal path from the clock generator to the IC where the clock is ultimately provided, since not only the EMI noise occurring from the ICs using the display clock 124 but also the EMI noise occurring from the wires establishing the connections among these ICs to carry the display clock 124 can be efficiently decreased totally, the EMI noise occurring from the entirety of liquid crystal projector 100 can be efficiently decreased.

C. Third Exemplary Embodiment

As described above, the spread spectrum is applied to the clock used by the largest number of ICs among a plurality of types of clocks in the first exemplary embodiment as well as the clock having the longest signal path from the clock generator to the IC where the clock is ultimately provided.

In the contrast to the above, in the present exemplary embodiment, the spread spectrum is applied to the clock having the highest frequency.

As described above, the frequency spectrum of the EMI noise generally has the peaks of the amplitudes at the frequency (f1) of the clock and each of the frequencies (f2, f3 . . . ) corresponding to the harmonics thereof. Accordingly, when there are, for example, the 50 MHz clock and the 100 MHz clock as the clocks, both are compared with respect to a harmonic of 200 MHz. Since 200 MHz is a quadruple of 50 MHz and 100 MHz is a double of 50 MHz, the 100 MHz is lower in terms of the order of the harmonic. Generally, as the order of the harmonic decreases, the energy thereof increases. The energy of the EMI noise caused by the 100 MHz clock is therefore higher than that of the EMI noise caused by the 50 MHz clock with respect to an EMI noise of 200 MHz.

Hence, as described above, by applying the spread spectrum to the clock with the highest frequency, the energy of the EMI noise occurring in the liquid crystal projector 100 as a whole can be efficiently decreased, thus realizing a decrease in the EMI noise.

D. Fourth Exemplary Embodiment

As described above, the clock is generated by the clock generator. The energy of the clock output from the clock generator usually increases in proportion to the square of the output current output from the clock generator. Since the EMI noise is caused by the clock, the energy of the EMI noise increases in accordance with increase in that of the clock output from the clock generator.

Therefore, in the present exemplary embodiment, the spread spectrum is applied to the clock whose current output from the clock generators is highest.

By applying the spread spectrum to such a clock, the energy of the EMI noise generated from the liquid crystal projector 100 as a whole can be efficiently decreased, thus realizing decrease in the EMI noise.

E. Fifth Exemplary Embodiment

The energy of the clock output from the clock generator usually increases in accordance with increase in the driving power voltage to drive the clock generator. As described above, the energy of the EMI noise increases in accordance with increase in the energy of the clock output from the clock generator.

Therefore, the spread spectrum is applied to the clock whose driving power voltage for driving the clock generator is highest.

By applying the spread spectrum to such a clock, in the same manner as the fourth exemplary embodiment, the energy of the EMI noise generated from the liquid crystal projector 100 as a whole can be efficiently decreased as well, realizing a decrease in the EMI noise.

F. Exemplary Modifications

The present invention is not limited to the above-described exemplary embodiments and modes, and various modes of the present invention can be made without departing from the spirit and scope thereof.

In the above first exemplary embodiment, the spread spectrum is applied to only the clock used by the largest number of ICs, which is the display clock 124, while the spread spectrum is not applied to the other clocks, which are the memory clock 122 and the system clock 126. However, the spread spectrum may be applied to, for example, the memory clock 122 other than the display clock 124. That is, the spread spectrum only has to be applied to at least the clock used by the largest number of ICs where there is a plurality of types of clocks in the electronic apparatus. This is applied to the other embodiments as well.

Although constructed using ICs independent to one another in the above first exemplary embodiment, the clock generator 116 or 120 generating the non-spread spectrum clock and the clock generator 118 generating the spread spectrum clock may be constructed using the same IC.

Figure 2:
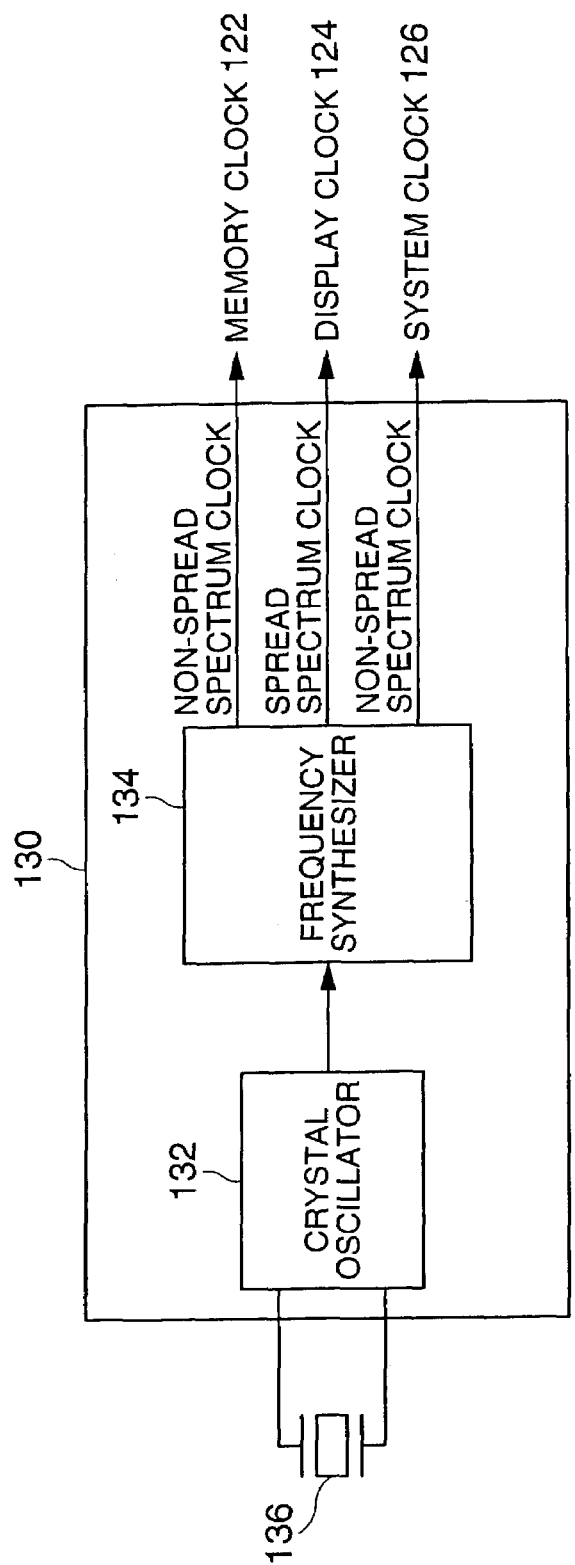
FIG. 2 is a schematic showing one example in which a clock generator generating a non-spread spectrum clock and a clock generator generating a spread spectrum clock are constructed using the same IC.
Figure 3:
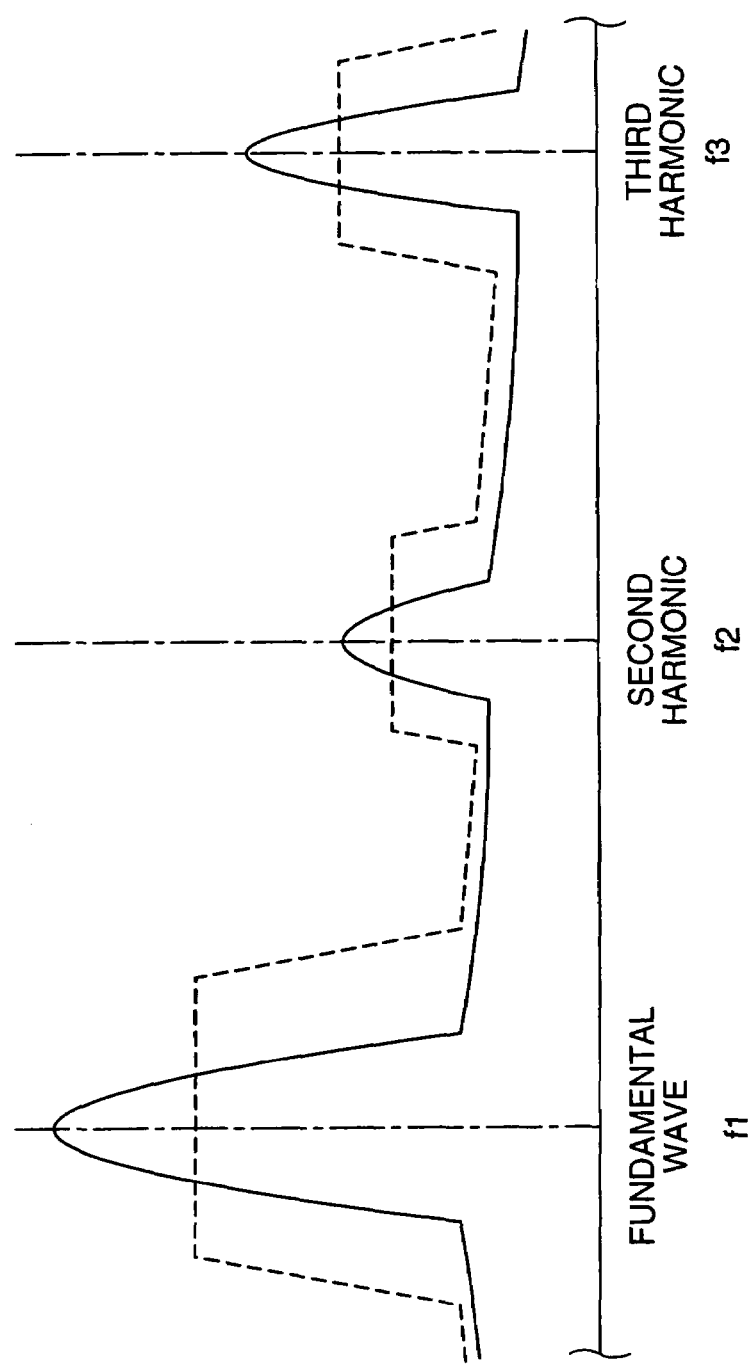
FIG. 3 is a schematic showing an exemplary frequency spectrum of a clock.

FIG. 2 is a schematic that shows one example of a construction in which the clock generator generating the non-spread spectrum clock and the clock generator generating the spread spectrum clock are constructed using the same IC. In this example, the three clock generators shown in FIG. 1 are constructed using the same IC. This IC 130 is provided with a crystal oscillator 132 and a frequency synthesizer 134 and is connected to a crystal resonator 136 outside. In this IC 130, the crystal oscillator 132 employs the crystal resonator 136 as the inductive impedance to generate a signal having a constant frequency, from which signal the frequency synthesizer 134 generates each of two non-spread spectrum clocks having different frequencies and a spread spectrum clock undergoing the spread spectrum with a predetermined spread amount, whereby the memory clock 122, the system clock 126, and the display clock 124 are obtained.

Thus, constructing the clock generator that generates the non-spread spectrum clock and the clock generator that generates the spread spectrum clock so that they share the same IC that contributes curtailment of the number of parts and the area occupied on the circuitboards.

In the above example, the three clock generators indicated in FIG. 1 are constructed using the same IC. A combination of, for example, the clock generators 116 and 118 or the clock generators 120 and 118 may be constructed using the same IC.

What is claimed is:

1. An electronic apparatus operating based on a plurality of types of clocks including a spread spectrum clock having a frequency spectrum that is spread and a non-spread spectrum clock having a frequency spectrum that is not spread, the electronic apparatus comprising:
    a plurality of ICs using the clocks as references for operations, at least one clock that is used by a largest number of ICs being the spread spectrum clock from among the plurality of types of clocks,
    wherein the plurality of ICs includes a first group of ICs and a second group of ICs, the spread spectrum clock being used by the first group of ICs, the non-spread spectrum clock being used by the second group of ICs, and the first group having a number of ICs that is larger than that of the second group.

2. An electronic apparatus operating based on a plurality of types of clocks including a spread spectrum clock having a frequency spectrum that is spread and a non-spread spectrum clock having a frequency spectrum that is not spread, the electronic apparatus comprising:
    a plurality of ICs using the clocks as references for operations; and
    at least one clock generator generating the clocks, at least one clock with a longest signal path from the clock generator generating the clock to the IC where the clock is ultimately provided being the spread spectrum clock from among the plurality of types of clocks,
    wherein the plurality of ICs includes a first IC and a second IC, the spread spectrum clock being used by the first IC, the non-spread spectrum clock being used by the second IC, and a signal path from the at least one clock generator to the first IC being longer than that from the at least one clock generator to the second IC.

3. An electronic apparatus, comprising:
    a structure being operable based on a plurality of types of clocks including a spread spectrum clock having a frequency spectrum that is spread and a non-spread spectrum clock having a frequency spectrum that is not spread, at least one clock with a highest frequency being the spread spectrum clock from among the plurality of types of clocks,
    wherein the plurality of clocks includes a first clock and a second clock, the spread spectrum clock being the first clock, the non-spread spectrum clock being the second clock, and the first clock having a frequency higher than that of the second clock.

4. An electronic apparatus operating based on a plurality of types of clocks including a spread spectrum clock having a frequency spectrum that is spread and a non-spread spectrum clock having a frequency spectrum that is not spread, the electronic apparatus comprising:
at least one clock generator generating the clocks, at least one clock with a highest output current from the clock generator being the spread spectrum clock from among the plurality of types of clocks,
wherein the plurality of clocks include a first clock and a second clock, the spread spectrum clock being the first clock, the non-spread spectrum clock being the second clock, and the first clock having an output current from the clock generator that is higher than the current from the clock generator to the second clock.

5. An electronic apparatus operating based on a plurality of types of clocks including a spread spectrum clock having a frequency spectrum that is spread and a non-spread spectrum clock having a frequency spectrum that is not spread, the electronic apparatus comprising:
at least one clock generator generating the clocks, at least one clock with a highest driving power voltage of driving the clock generator being the spread spectrum clock from among the plurality of types of clocks,
wherein the plurality of clocks include a first clock and a second clock, the spread spectrum clock being the first clock, the non-spread spectrum clock being the second clock, and the first clock having a driving power voltage higher than that of the second clock.

6. The electronic apparatus as set forth in claim 1:
the at least one clock generator including at least a first clock generator generating the spread spectrum clock and a second clock generator generating the non-spread spectrum clock, the first clock generator and the second clock generator being constructed sharing the same IC.

7. A projector, comprising:
a liquid crystal panel operable based on a plurality of types of clocks including a spread spectrum clock having a frequency spectrum that is spread and a non-spread spectrum clock having a frequency spectrum that is not spread, at least one clock ultimately provided to the liquid crystal panel being the spread spectrum clock from among the plurality of types of clocks, and
a plurality of ICs using the clocks as references for operations, at least one clock that is used by a largest number of ICs being the spread spectrum clock from among the plurality of types of clocks,
wherein the plurality of ICs includes a first group of ICs and a second group of ICs, the spread spectrum clock being used by the first group of ICs, the non-spread spectrum clock being used by the second group of ICs, and the first group having a number of ICs that is larger than that of the second group.

8. The electronic apparatus as set forth in claim 1, another clock that is used by another IC being the non-spread spectrum clock, the another clock being different from the at least one clock that is used by the largest number of ICs, the another IC not being one of the largest number of ICs.

9. The electronic apparatus as set forth in claim 2, another clock being the non-spread spectrum clock, the other clock being different from the at least one clock.

10. The electronic apparatus as set forth in claim 3, another clock being the non-spread spectrum clock, the other clock being different from the at least one clock with the highest frequency.

11. The electronic apparatus as set forth in claim 4, another clock being the non-spread spectrum clock, the other clock being different from the at least one clock with the highest output current.

12. The electronic apparatus as set forth in claim 5, another clock being the non-spread spectrum clock, the other clock being different from the at least one clock with the highest driving power voltage.

13. The projector as set forth in claim 7, another clock being the non-spread spectrum clock, the other clock being different from the at least one clock ultimately provided to the liquid crystal panel.

14. The electronic apparatus as set forth in claim 8, the another IC being an IC that belongs to an IC group having a second largest number of ICs or an IC that belongs to an IC group having a third largest number of ICs.

* * * * *